United States Patent [19]
Cook et al.
[11] 3,939,467
[45] Feb. 17, 1976

[54] TRANSDUCER

[75] Inventors: Rufus L. Cook; Henry L. Warner, both of Panama City, Fla.

[73] Assignee: The United States of America as represented by the Secretary of the Navy, Washington, D.C.

[22] Filed: Apr. 8, 1974

[21] Appl. No.: 458,960

[52] U.S. Cl. .......................... 340/8 R; 310/9; 310/6; 340/10
[51] Int. Cl.$^2$ .......................... H04B 13/00
[58] Field of Search ................ 340/8 R, 9, 10, 12 R; 310/9, 6

[56] References Cited

UNITED STATES PATENTS

| | | | |
|---|---|---|---|
| 2,520,938 | 9/1950 | Klein | 340/8 |
| 2,689,947 | 9/1954 | Fry | 340/10 |
| 2,716,708 | 8/1955 | Bradfield | 340/10 UX |
| 2,820,214 | 1/1958 | O'Neill | 340/6 R X |
| 2,925,582 | 2/1960 | Mattei et al. | 340/10 |
| 3,212,056 | 10/1965 | Grieg | 340/9 |
| 3,359,537 | 12/1967 | Geil et al. | 340/9 X |
| 3,603,921 | 9/1971 | Dreisback | 340/10 |
| 3,833,825 | 9/1974 | Haan | 340/10 X |
| 3,854,060 | 12/1974 | Cook | 340/8 |

*Primary Examiner*—Stephen C. Bentley
*Assistant Examiner*—Harold Tudor
*Attorney, Agent, or Firm*—Richard S. Sciascia; Don D. Doty; Harvey A. David

[57] ABSTRACT

An electroacoustical transducer is disclosed as incorporating a metallic housing having an aperture located in the wall thereof. A plurality of shutters are rotatably mounted on said housing for effectively and timely opening and closing predetermined portions of said aperture. A plastic support member is disposed within said housing, and a slot is located therein in alignment with said aperture. A wooden frame is disposed in said slot in such manner as to effect a semi-resilient lining therefor, and an electroacoustical energy converter element is disposed within said frame lining. A shutter actuator, either programmed or manually operated, is connected to said plurality of shutters for respectively moving them in such manner as to effect predetermined openings and closings of the aforesaid aperture. A utilization apparatus, such as for example, a sonar transceiver, is connected to the aforesaid energy converter element for energization thereof and for response thereto during transmit and receive modes of operation, respectively.

1 Claim, 16 Drawing Figures

TRANSDUCER

STATEMENT OF GOVERNMENT INTEREST

The invention described herein may be manufactured and used by or for the Government of the United States of America for Governmental purposes without the payment of any royalties thereon or therefor.

FIELD OF THE INVENTION

The invention relates, in general, to energy converters and is, in particular, a transducer for converting electrical energy into acoustical energy proportional thereto and vice versa. In even greater particularity, the subject invention is an electroacoustical transducer that may be deployed underwater and used in conjunction with signal generators, sonar transmitters and receivers (transceivers) and other utilization apparatus.

DESCRIPTION OF THE PRIOR ART

Heretofore, numerous electroacoustical transducers have been invented and patented which convert electrical energy to acoustical energy and vice versa. In fact, the number thereof is too numerous to discuss in any great detail; hence, it would not appear to be unreasonable to presume that the electroacoustical transducer art is crowded, indeed.

As examples of some of the prior art, U.S. Pat. No. 2,716,708 to Bradfield, U.S. Pat. No. 3,243,766 to Walther, U.S. Pat. No. 3,478,309 to Massa, Jr., and U.S. Pat. No. 3,603,921 to Dreisback are hereby mentioned, especially since they ostensively incorporate various and sundry piezoelectric energy converting elements mounted in various and sundry housing means, respectively. Of course, none thereof (and none known to the Inventors) contain the new combination of elements incorporated in the subject claimed invention, nor does any thereof appear to produce the new, improved, and useful results effected thereby. Moreover, there appears to be no simple teaching in the prior art of any method and means for selectively "playing" an electroacoustical transducer in such manner that different signal frequencies or different combinations of acoustical and electrical signal frequencies are operative therein, either individually or collectively, in predetermined harmony or disharmony, or otherwise, as desired. Therefore, the electroacoustical transducers of the prior art appear to be limited in their operational capabilities, as compared to that claimed herein.

SUMMARY OF THE INVENTION

Obviously, for many practical purposes, the electroacoustical transducers of the prior art are quite satisfactory; however, for some practical purposes they ostensively leave something to be desired. Accordingly, for some purposes the instant invention overcomes the disadvantages of the devices of the prior art.

Briefly, the invention comprises one or more substantially comb-like shaped piezoelectric elements of varying "teeth" design and dimensions, and, with the exception of the projection-reception "window" thereof, is framed by a balsa wood support that is suitably mounted as a lining within a slot within a plastic body that is preferably housed within an appropriate metallic housing in such manner that the aforementioned window also exists therethrough in alignment therewith.

In front of said projection-reception window — and, hence, in front of the projection-reception surfaces of said piezoelectric elements — are a plurality of shutters, each of which are movably connected by hinge means to the aforesaid housing in such manner that they may be adjusted to open and close desired portions of the aforesaid "window", thereby, in effect, allowing the entire electroacoustical to be "played" or tuned, as the case may be.

The aforementioned shutters may be any number desired for any given operational situation; moreover, they may be opened and closed by any suitable conventional actuator, programmed or manual, as desired.

It is, therefore, an object of this invention to provide an improved transducer.

Another object of this invention is to provide an improved method and means for tuning an electroacoustical transducer, so that the broadcast and reception patterns thereof may be varied to suit operational circumstances without withdrawing the transducer from the environmental medium within which it is working.

Still another object of this invention is to provide an improved adjustable — that is, broadband to narrow band and vice versa — electroacoustical transducer.

A further object of this invention is to provide an electroacoustical transducer that has a predetermined substantially flat frequency response (transmitting voltage) curve within the one hundred to one thousand kilocycles per second frequency range.

Another object of this invention is to provide an electroacoustical transducer which will selectively broadcast and receive two or more separated signal frequencies simultaneously.

Still another object of this invention is to provide an electroacoustical transducer which will selectively broadcast and receive two or more signal frequency ranges simultaneously.

A further object of this invention is to provide an improved sonar transducer, the operative frequencies and broadcast and response patterns of which may be adjusted, tuned, or played — either individually or in predetermined concert — by a programmed actuator or manually by a human operator, as desired, while it is deployed under water or within any other compatible environmental medium.

Other objects and many of the attendant advantages will be readily appreciated as the subject invention becomes better understood by reference to the following detailed description, when considered in conjunction with the accompanying drawings.

DESCRIPTION OF THE PREFERRED EMBODIMENTS

Figure 1:
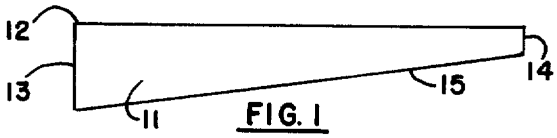
FIG. 1 is an elevational view of a piezoelectric energy converter element having a predetermined solid wedge geometrical configuration.

Referring now to FIG. 1, there is shown a solid wedge-shaped piezoelectric electroacoustical energy converter element 11 having a planer projector-receptor surface 12 that is perpendicular to the left and right edges 13 and 14 thereof. The rear surface 15 of element 11 is disposed at an angle wih said left and right edges 13 and 14 and, hence, would also make a predetermined angle with front edge 12, if extended sufficiently to intersect therewith, thereby effecting an overall tapered or wedge-shaped structural configuration. A nominal slope of, say, 6° has been found to be quite satisfactory for many practical purposes; however, it should be understood that any desired angle therefor may be used that would optimize piezoelectric element 11 for any given operational situation.

Figure 2:
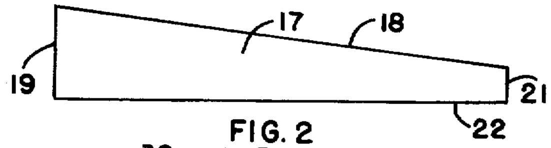
FIG. 2 is an elevational view of a piezoelectric energy converter element having another predetermined solid wedge geometrical configuration.

As seen in FIG. 2, another solid wedge-shaped piezoelectric electroacoustical energy converter element 17 is shown as having a tapered projector front surface 18, left and right ends 19 and 21, and rear or back surface 22. Of course, piezoelectric element 17 differs from element 11 because the taper thereof is effected by front surface 18 being angled with respect to sides 19 and 21. Again, although 6° is suitable for said taper, other angles (including the compounding of said tapers) may be employed if so desired.

Of course, it is well known in the art that tapered piezoelectric crystals per se have been used for various and sundry purposes. For example, expired U.S. Pat. No. 2,485,722 to W. S. Erwin discloses that piezoelectric crystals have a natural resonant frequency may be employed to accurately control the frequencies of oscillators, and that tapered or wedge-shaped piezoelectric crystals may be "tuned" and used to vibrate various structures at frequencies other than their resonant frequency, because they have no particular resonant frequency due to their geometrical configurations. On the other hand, there appears to be no specific teaching in said patent to Erwin of the unique combination of elements incorporated in the instant claimed invention, which includes the incorporation therein of wedge and other shaped piezoelectric elements.

Figure 3:
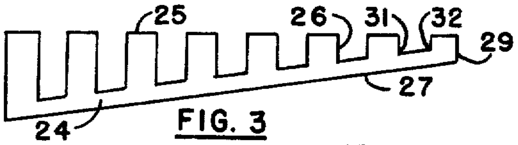
FIG. 3 is an elevational view of a piezoelectric element having a grooved wedge geometrical configuration.

FIG. 3 illustrates a grooved wedge-shaped piezoelectric element 24. The front surface, as may readily be seen, is cut in such manner that a plurality of posts 25 separated by a plurality of grooves 26 are effected. As also may readily be seen, a tapered base or spine 27 is effected because the back surface 27 is angled with respect to left and right ends 28 and 29. The resulting geometrical configuration consists of a plurality of alternate posts and grooves having decreasing dimensions, respectively, thereby producing predetermined broadband operational characteristics, as will be discussed more fully subsequently. Of some significance perhaps, is the fact that the forward (top) operational projector-receptor faces of posts 25 are normal to their sides and to the aforesaid end surfaces 28 and 29, while grooves 26 are of different angular dimensions or lengths at the bottom portions 31 and 32 thereof. Of course, the different length posts 25 and grooves 26 occur as a result of the tapering of backing or spine 27 integrally connected thereto.

Figure 4:
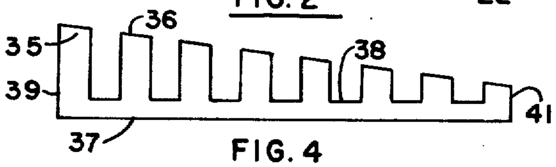
FIG. 4 is an elevational view of another piezoelectric element having a grooved wedge geometrical configuration that is different from that depicted in FIG. 3.

The piezoelectric element 35 of FIG. 4, is somewhat similar to that of FIG. 3, with the exception that the forward (top) operated faces of posts 36 are slanted or tapered in such manner as to successively decrease in length, while being integrally connected to and extending perpendicularly from spine or backing 37. Of course, a plurality of grooves 38 respectively separate said posts 36. In this embodiment, ends 39 and 41 are normal to spine 37, too.

Figure 5:
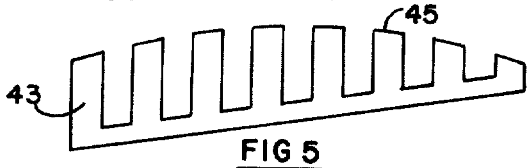
FIG. 5 is an elevational view of another piezoelectric element having a combination grooved wedge and convex operative surface geometrical configuration.
Figure 6:
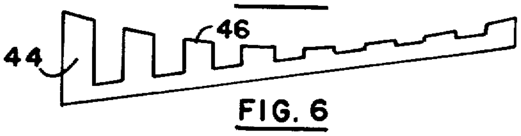
FIG. 6 is an elevational view of another piezoelectric element having a combination grooved wedge and concave operative surface geometrical configuration.

FIGS. 5 and 6 illustrate piezoelectric crystal elements 43 and 44 that are somewhat similar to those of FIGS. 3 and 4, respectively, with the exception that the respective projector-receptor front post surfaces 45 and 46 thereof are curved in predetermined convex and concave manners. Because the remaining structures thereof are ostensively obvious from the drawing, for the purpose of keeping this disclosure as simple as possible, no further discussion thereof will be presented at this time.

Figure 7:
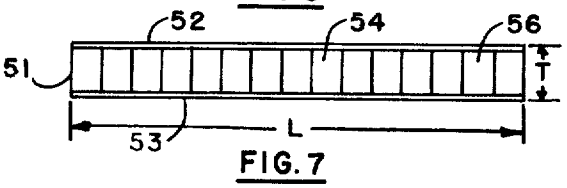
FIG. 7 is a front view of a piezoelectric element having grooves incorporated therein in such manner as to effectively make it representative of the piezoelectric elements of FIGS. 3 through 6, as well as others not shown.

Referring now to FIG. 7, there is shown a top view of a piezoelectric element 51 that may be considered as being representated of the top projector-receptor surfaces of each of the piezoelectric elements of FIGS. 3 through 6. Also shown therein, is a pair of electrodes 52 and 53 which may be of any conventional type and which are connected to the sides of piezoelectric element 51, thereby causing the electric field to be applied to the faces or sides thereof that are normal to the length dimension of the transducer post elements thereof.

Although the piezoelectric element of FIG. 7 merely depicts a single row of alternately disposed energy converter posts 54 and grooves 56, it should be understood that there may be several rows thereof, and, furthermore, that the piezoelectric elements thereof may be diced as shown in expired U.S. Pat. No. 2,543,500 to C. F. Kettering et al or in U.S. Pat. No. 3,470,394 to R. L. Cook and L. D. Whatley, Jr., with the groove and post dimensions being selected by the artisan to fit the operational circumstances.

As may readily be seen, transducer energy converter element 51 of FIG. 7 may have any desired length L and any desired thickness T, as well as many posts and grooves as are necessary for any given operational situation.

Figure 8:
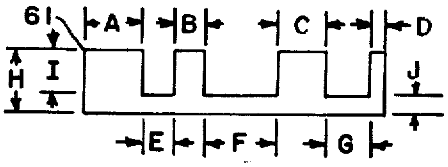
FIG. 8 is a very generalized elevational view of a piezoelectric element showing that the various and sundry dimensions thereof may be varied in accordance with the design choice of the artisan.

FIG. 8 illustrates a piezoelectric element 61 which contains various and sundry shaped and dimensioned posts, grooves, spines, and the like. Accordingly, dimensions A, B, C, D, E, F, G, H, I, and J, as well as all other possible dimensions, may be varied and design selected as necessary by the artisan, in order to produce the geometrical configuration and projector-receptor patterns desired for any given operational circumstances.

Figure 9:
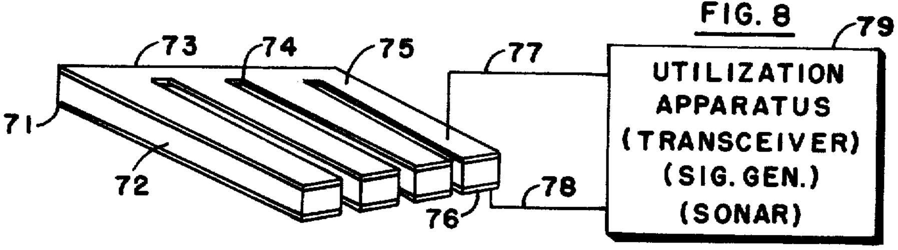
FIG. 9 is a schematic perspective view of a diced piezoelectric element in combination with a sonar or other transceiver apparatus.

Referring now to FIG. 9, another simplified embodiment of a piezoelectric transducer element 71 is shown as containing a plurality of posts 72 connected to a common spine 73, with said posts 72 decreasing in length from left to right and separated by decreasing length grooves 74, respectively. Electrodes 75 and 76 are respectively attached in any conventional manner to the sides of posts 72 and/or spine 73.

Connected to electrodes 75 and 76 are a pair of electrical conductors 77 and 78, the other ends of which are connected to the inputs-outputs of any appropriate compatible utilization apparatus 79.

Of course, utilization apparatus 79 may be generally described as being a transceiver or a signal generator, or it may be defined more specifically as being a sonar system.

Figure 10:
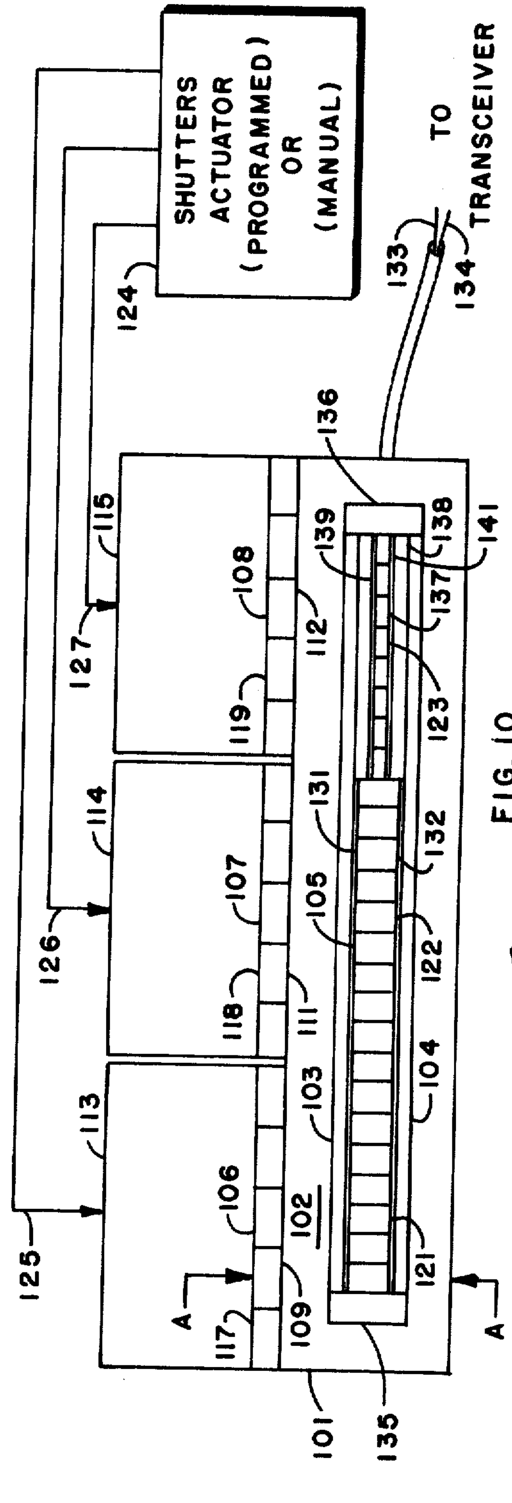
FIG. 10 is a front elevational view of the turnable electroacoustical transducer of this invention.
Figure 11:
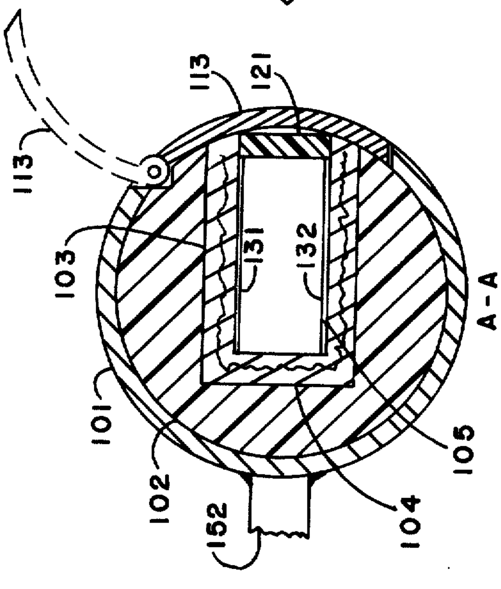
FIG. 11 is one representative cross-sectional view of the transducer of FIG. 10, taken at A—A thereof.
Figure 12:
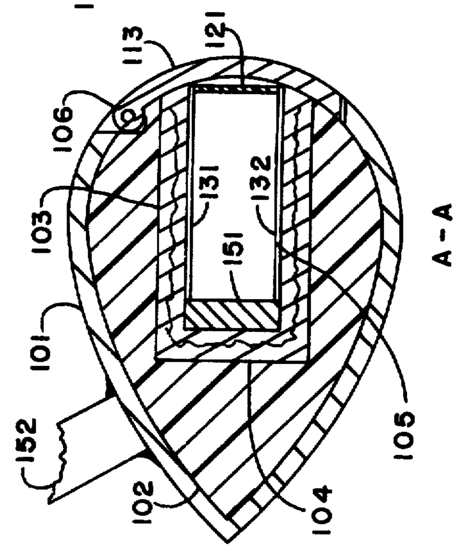
FIG. 12 is another possible cross-sectional view of the transducer of FIG. 10, taken at A—A thereof.
Figure 13:
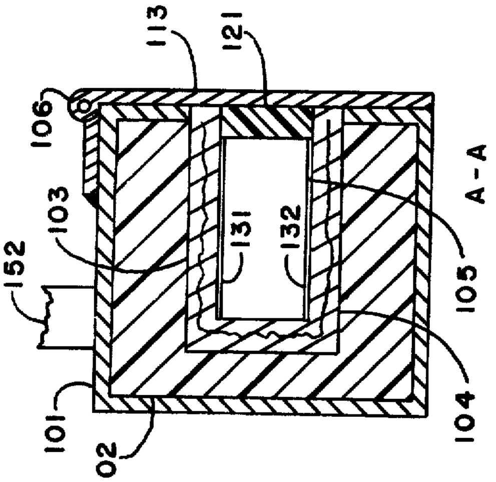
FIG. 13 is still another typical cross-sectional view of the transducer of FIG. 10, taken at A—A thereof.

A front view of a generalized preferred embodiment of the electroacoustical transducer constituting this invention is depicted in FIG. 10, while several possible cross-sectional configurations therefor are illustrated in FIGS. 11, 12, and 13. Therefore, for purpose of simplicity of disclosure, like parts of FIGS. 10 through 13 will be referenced by like numerals.

Accordingly, referring now to FIGS. 10 through 13, there is shown a metallic housing 101, with a plastic support member 102 disposed in tight fit relationship therein. A slot 103 is located in plastic support member 102, and disposed therein is a three-sided, box-like balsa wood frame 104 which, in turn, has a piezoelectric energy converter element 105 mounted therein.

Piezoelectric element 105 may be made of lead zirconate or other piezoelectric material and may be identical to or similar in configuration to any one of the piezoelectric elements depicted in FIGS. 1 through 9; however, for the purpose of disclosing a preferred embodiment herein, piezoelectric element 24, having a comb-like configuration, will be selected therefor.

Housing 101 has hinges 106, 107, and 108 (the latter two of which are shown only in FIG. 10) connected thereto as by weldings 109, 111, and 112, or any other suitable conventional means, to which a like number of shutters 113, 114, and 115 are respectively connected thereto, again as by welding 117, 118, and 119, or any other suitable conventional means. Shutters 113, 114, and 115 are preferably made of stainless steel and are, of course, designed to be rotated on their respective hinges in such manner as to open and close acoustical windows 121, 122, and 123 which are effectively in alignment with predetermined ones of the projector-receptor surfaces of the aforesaid piezoelectric energy converter 105.

A shutters actuator 124 is connected by suitable rods, levers, servomechanisms 125, 126, and 127, or the like, to shutters 113, 114, and 115, respectively, in order to properly and timely effect movement thereof in such manner as to open and close the acoustical windows of which they are in front.

Shutters actuator 124 may be of the type which is manually operated by a human operator, or it may be of the type that moves the acoustic window shutters automatically and in accordance with a predetermined program. In either case, it allows the piezoelectric energy converters to be "played" as one might play a musical instrument, viz., one frequency (or tone) at a time, several frequencies (or tones) at a time, or all frequencies (or tones) at the same time.

Although only three shutters are disclosed herein in conjunction with actuator 124, any number thereof may be incorporated in the invention. Obviously, it would be well within the purview of one skilled in the art having the benefit of the teachings presented herewith to select whatever number of shutters, shutter actuators, and piezoelectric electroacoustical elements necessary to meet any predetermined operational requirements.

Connected to both sides of piezoelectric element 105 are electrodes 131 and 132, to which electrical lead conductors 133 and 134 are connected, the latter of which are adapted for being connected to a transceiver or other utilization apparatus.

Disposed in front of piezoelectric element 105 is the aforementioned acoustically clear window material 121. The material thereof may be polyurethane and, if desired, may also be used as a potting for filling the grooves thereof and all other spaces not occupied thereby. Hence, ends 135 and 136 (of FIG. 10) may be of such potting polyurethane material (or balsa wood, if preferred).

As best seen in FIG. 10, several different size and configuration piezoelectric elements may be optionally included in the same transducer. Hence, another of such elements 137 supported in another balsa wood frame 138 may be included in slot 103 of plastic support member 102. In such case, electrodes 139 and 141 are or may be connected to electrical conductors 133 and 134, respectively.

Inspection of FIG. 12, will disclose that the embodiment depicted therein has a metallic backing-loading plate 151 disposed between the rear end of piezoelectric element 105 and balsa wood box frame 103. Backing-loading plate 151 should, of course, be designed, and configured for the proper support of the spine of said piezoelectric element 105, regardless of its particular geometrical configuration.

Also, as indicated in FIG. 12, window material 121 may be a thin film of acoustically clear plastic that is used for sealing the forward surfaces of piezoelectric element 105, so that they are watertight when the subject transducer is being used as an underwater transducer.

Connected to housing 101 of each of the embodiments of FIGS. 11, 12, and 13 is a mounting strut 152 which is adapted to be connected to any suitable carrier vehicle or other mounting means (not shown).

In phantom, shutter 113 of the device of FIG. 11 is shown in a hinged open condition. All of the other shutters open and close likewise.

As is undoubtedly evident by now, the housing designs of FIGS. 11, 12, and 13 are somewhat different, one of which is circular in cross-section, one of which is streamlined in cross-section, and one of which is substantially square in cross-section. Obviously, other cross-sectional configurations may be substituted therefor by the artisan. In any event, the cross-sections thereof, although each is different from the others, may be considered as having been taken at A—A of FIG. 10.

Figure 14:
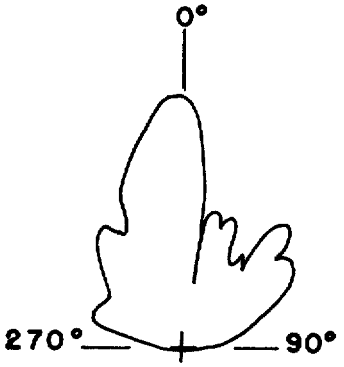
FIGS. 14 and 15 depict typical broadcasting and receiving acoustical patterns in the vertical and horizontal positions, respectively.
Figure 15:
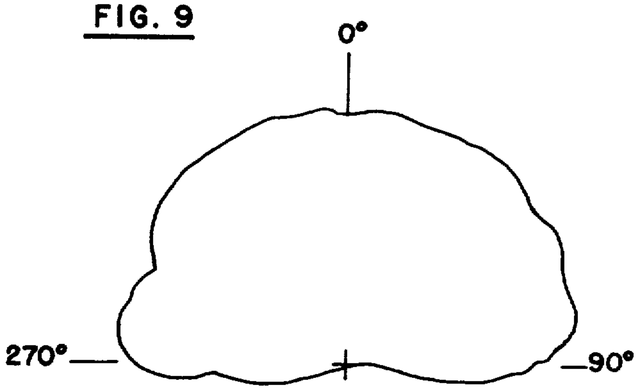
Figure 16:
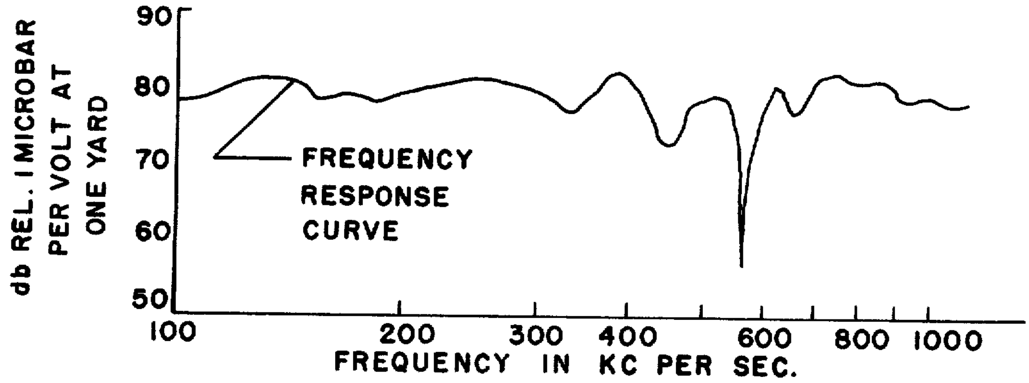
FIG. 16 discloses a representative frequency response curve for the invention.

FIGS. 14 and 15 disclose typical broadcasting and receiving acoustical patterns of the invention in the vertical and horizontal positions, respectively; and FIG. 16 is a representative frequency response — that is, transmitting voltage response — curve therefor. Because their inclusion herein is functional, rather than structural, they will be discussed below in connection with the explanation of the operation of the invention.

MODE OF OPERATION

The operation of the invention will now be discussed briefly in conjunction with all of the figures of the drawing.

The operation of the invention is very simple. Electrical energy is either supplied to piezoelectric element 105 (of FIG. 10) by, say, a sonar (FIG. 9) or is received thereby therefrom. Hence, the device of FIG. 10 may be said to be operationally reversible.

As acoustical energy is being received or broadcast by element 105, shutters 113, 114, and/or 115 are timely opened and closed by shutters actuator 124, to thereby effect the playing or tuning thereof. In the alternative, all of the aforesaid shutters may be opened at the same time, in which case the instant transducer becomes broadband, has a frequency response curve similar to that shown in FIG. 16 if the embodiment of the piezoelectric element of FIG. 3, for example is incorporated therein, and, thus, may have vertical and horizontal response pattern (in water) similar to those shown in FIGS. 14 and 15.

At this time, it would appear to be noteworthy that any one of the embodiments of the piezoelectric elements of FIGS. 1 through 8 may be incorporated as elements 105 and/or 137 in the electroacoustical transducer of FIG. 10, depending on the transmission and reception frequency band characteristics and radiation and response patterns desired for any given operational circumstances. Moreover, the structural design thereof may be varied, as far as width, length, depth, post configuration, element intermingling, etc., are concerned. Hence, for instance, FIG. 10 depicts piezoelectric elements 105 and 137 as having different widths and lengths, with shutters 113 and 114 operative to effectively tune the former, while shutter 115 is shown as being operative to effectively tune the latter. Therefore, it may readily be seen that the available and disclosed unique combinations of tuned and tuning methods and means of this invention plays a very important part therein. Hence, while it is recognized that some of the individual elements thereof may be well known and conventional per se, it should be readily apparent that, although relatively simple, their respective new and useful combinations and interactions constitute an invention of unique structural character and operational results. Of course, the particular frequency response curve of FIG. 16 and the radiation and response patterns of FIGS. 14 and 15 are and of themselves certainly indicate the improved electroacoustical operations that may be obtained from the invention, and, as such, are of considerable importance in the underwater transducer art.

As a general rule, but without limitation, the electroacoustical transducer of the subject invention is deployed within water, sea water, or the like, and in such instances is combined with a sonar transceiver or some other appropriate utilization apparatus, as best portrayed in the system of FIG. 9. Of course, in such arrangement, the invention has many useful purposes — such as, for example, the hunting, detection, and indication of various and sundry target objects located within said water or sea water and/or laying on or buried in the bottom or floor thereof. As such, then, the instant invention is an exceedingly useful component of a target location and identification sonar system. And the fact that it may be tuned or made broad band facilitates the acquiring of such targets and responding to them with considerable image resolution and electroacoustical fidelity. Accordingly, it ostensively constitutes an advance in the electroacoustical transducer art.

Although not shown, the subject transducer may be mounted by means of strut 152 (see FIGS. 11, 12, and 13) on any suitable mobile vehicle or stable platform as operational circumstances warrant. Hence, its physical deployment may be considered as being unlimited, as far as the mounting thereof is concerned.

Again, for purpose of emphasis, in the event it is desired to "play" the subject transducer in accordance with some particular program, the shutters thereof may be attached to a shutters actuator of either the programmed or manual type (such as actuator 124 of FIG. 10). Obviously, it could be "played", too, by applying appropriate electrical signals to electrical leads 133 and 134 during the transmission mode of operation or receiving only those electrical signals emanating therefrom that are desired during the reception mode of operation.

Because the types of utilization apparatus that are operationally compatible with the subject transducer are exceedingly numerous, only several — transceiver, signal generator, and sonar — are mentioned herein; however, it should be understood that it is not limited to only being combined therewith.

Obviously, other embodiments and modifications of the subject invention will readily come to the mind of one skilled in the art having the benefit of the teachings presented in the foregoing description and the drawings. It is, therefore, to be understood that this invention is not to be limited thereto and that said modifications and embodiments are intended to be included within the scope of the appended claims.

What is claimed is:

1. A tunable electroacoustical transducer system adapted for broadcasting acoustical energy to and receiving acoustical energy from an aqueous environmental medium, comprising in combination:

- a plurality of piezoelectric posts, each of which has an active forward end face for broadcasting and receiving acoustical energy to and from the aforesaid aqueous environmental medium, each of which has a rearward end, each of which is spatially disposed from adjacent ones thereof, and all of which are disposed in a single row of predetermined configuration with predetermined successively decreasing lengths from one end of said row to the other;
- a piezoelectric spine, with the forward end thereof integrally connected to the rearward end of each of said piezoelectric posts;
- a pair of electrodes connected to predetermined surfaces of said plurality of piezoelectric posts and said piezoelectric spine for receiving electrical energy therefrom and supplying electrical energy thereto;

a plastic support member having a slot therein within which said single row of piezoelectric posts, and piezoelectric spine, and said pair of electrodes are contained in such manner that the forward active end faces of said piezoelectric posts face outwardly therefrom and that said piezoelectric spine is located adjacent to but spatially disposed from the inner end of said slot;

a predetermined backing-loading plate dispose in abutment with the rearward end of the aforesaid spine;

a balsa wood frame disposed between the inside surface of the slot of said plastic support member and the outside of predetermined ones of those surfaces of said piezoelectric spine and posts consisting of the effectively inactive surfaces thereof, the rearward surface of said predetermined backing-loading plate, and the effective outside surfaces of said pair of electrodes;

encasement means having a wall of predetermined geometrical configuration with an elongated aperture located therein, with said encasement means surrounding the aforesaid plastic support in such manner that the aforesaid aperture thereof is located adjacent to the active forward end faces of said plurality of piezoelectric posts;

an acoustically clear plate means located within the end of and connected to said balsa wood frame in contiguous disposition with the active forward end faces of said plurality of piezoelectric posts for passing acoustical energy therethrough;

means connected to said encasement means for the mounting thereof on a predetermined platform;

a plurality of acoustically opaque shutters hinged to said encasement means in such manner that each one thereof may be rotated to effect the closure of predetermined portions of the aforesaid elongated aperture, thereby effectively inactivating predetermined ones of said single row of piezoelectric posts while permitting activation of the remaining ones thereof;

means connected to said plurality of acoustically opaque shutters for effecting the rotation thereof in such manner as to cause the timely opening and closing of predetermined portions of the aforesaid elongated aperture in accordance with a predetermined program, so as to permit the playing of the aforesaid tunable electroacoustical transducer system in accordance with said predetermined program; and a sonar system connected to said pair of electrodes.

* * * * *